(12) United States Patent
Basson et al.

(10) Patent No.: US 9,680,784 B2
(45) Date of Patent: Jun. 13, 2017

(54) MESSAGING IN ATTENTION CRITICAL ENVIRONMENTS

(71) Applicant: International Business Machines Corporation, Armonk, NY (US)

(72) Inventors: Sara H. Basson, White Plains, NY (US); Seth E. Bravin, Frederick, MD (US); William B. Huber, Austin, TX (US); Dimitri Kanevsky, Ossining, NY (US); Alfred J. Noll, Poughkeepsie, NY (US); Adam Skwersky, Malborough, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/010,413

(22) Filed: Jan. 29, 2016

(65) Prior Publication Data
US 2017/0048179 A1    Feb. 16, 2017

Related U.S. Application Data

(63) Continuation of application No. 14/823,009, filed on Aug. 11, 2015.

(51) Int. Cl.
*G08B 5/22*    (2006.01)
*H04L 12/58*    (2006.01)

(52) U.S. Cl.
CPC .................... *H04L 51/18* (2013.01)

(58) Field of Classification Search
CPC ..... H04L 51/02; H04L 12/5805; H04L 51/14; H04L 67/22; H04L 67/325; H04M 1/64;
(Continued)

(56) References Cited

U.S. PATENT DOCUMENTS 6,452,597 B1    9/2002 Goldberg et al.
8,176,420 B2    5/2012 Lekutai
(Continued)

FOREIGN PATENT DOCUMENTS

GB    2476543 A    6/2011

OTHER PUBLICATIONS

Brumfield et al., "Text a driver in New Jersey, and you could see your day in court", Updated 2:40 PM ET, Thu Aug. 29, 2013, pp. 1-9, © 2015 Cable News Network, Turner Broadcasting System, Inc.,    <http://www.cnn.com/2013/08/29/us/new-jersey-texting-crash-sender-liable/index.html>.
(Continued)

*Primary Examiner* — Omeed Alizada
(74) *Attorney, Agent, or Firm* — Steven F. McDaniel

(57) ABSTRACT

A method, executed by one or more processors, includes receiving a message that is addressed to a user, determining, via one or more sensors, whether the user is occupied with an attention critical situation, and conducting a user-directed response process responsive to determining that the user is not occupied with an attention critical situation. In some embodiments, the user-directed response process includes conducting a text substitution process on the message, presenting an abbreviated version of the message and a list of response options to the user, determining a response option that is selected by the user, and sending a response to the message that corresponds to the response option that is selected by the user. In some embodiments, the list of response options includes a plurality of message-dependent formulated responses, a null response, and a spoken response. A corresponding apparatus and computer program product are also disclosed herein.

1 Claim, 7 Drawing Sheets

(58) Field of Classification Search
CPC ..... H04M 1/72552; H04W 4/12; H04W 4/14; H04W 4/16
See application file for complete search history.

(56) References Cited

U.S. PATENT DOCUMENTS

| | | | |
|---|---|---|---|
| 8,315,597 | B2 | 11/2012 | Olincy et al. |
| 8,401,578 | B2 | 3/2013 | Inselberg |
| 8,868,670 | B2 | 10/2014 | Bagga et al. |
| 9,100,809 | B2 | 8/2015 | Olincy et al. |
| 2009/0221311 | A1* | 9/2009 | Potts .................. H04M 3/5307 455/466 |
| 2010/0184406 | A1 | 7/2010 | Schrader |
| 2011/0136509 | A1 | 6/2011 | Osann, Jr. |
| 2012/0329444 | A1 | 12/2012 | Osann, Jr. |
| 2013/0038437 | A1 | 2/2013 | Talati et al. |
| 2013/0189964 | A1 | 7/2013 | Thompson |
| 2014/0136963 | A1 | 5/2014 | Chen |
| 2014/0303842 | A1 | 10/2014 | Boelter et al. |
| 2015/0045003 | A1* | 2/2015 | Vora ........................ H04M 1/64 455/412.2 |
| 2015/0066501 | A1 | 3/2015 | Thapliyal |
| 2015/0095770 | A1 | 4/2015 | Mani et al. |
| 2015/0266377 | A1 | 9/2015 | Hampiholi et al. |

OTHER PUBLICATIONS

Lefebvre, Rob, Customize Your Text Replies to iPhone Calls When Busy [iOs Tips], pp. 1-13, Cult of Mac © Cultomedia Corp 2009-2015, <http://www.cultofrnac,com/195743/customize-your-text-repiies-to-iphone-calls-when- busy-ios-tips/>.

Lefebvre, Rob, "The Ten Killer Tips Every iOS 6 User Needs to Know [Feature]", Sep. 19, 2012, pp. 1-21, Cult of Mac © Cultornedia Corp 2009-2015, <http://www.cultofmac.com/191432/the-ten-killer-tips-every-ios-6-user-needs-to-know-feature/>.

National Safety Council, "Understanding the distracted brain", Why driving while using hands-free cell phones is risky behavior, White Paper Apr. 2012, pp. 1-24, <http://www.nsc.org/Distracted-DrivingDocuments/Cognitive-Distraction-White-Paper.pdf>.

"Automatic Text Summarizer", Online Text Summary Generator—Free automatic text summarization tool, pp. 1-1, <http://autosummarizer.com/>, provided by inventor on Jul. 17, 2015.

"Free Mobile App Stops Texting While Driving", DriveSafe.ly®—The App to Stop Distracted Driving, by iSpeech®, pp. 1-2, <http://www.drivesafe.ly/>, noted by inventor in Main Idea dated May 1, 2015.

"Listen to Emails While Driving", DriveSafe.ly®—The App to Stop Distracted Driving, by iSpeech®, pp. 1-2, <http://www.drivesafe.ly/listens-to-emails-while-driving/#location>, noted by inventor in Main Idea dated May 1, 2015.

"Listen to Text Messages While Driving", DriveSafely®—The App to Stop Distacted Driving, by iSpeech®, pp. 1-2, <http://www.drivesafe.ly/listens-to-text-messages-while-driving/#location>, noted by inventor in Main Idea dated May 1, 2015.

"Texting", Abbreviations.com, STANDS4 LLC, 2015, Web, Jul. 21, 2015, pp. 1-5, <http://www.abbreviations.com/acronyms/sms>, provided by inventor on Jul. 17, 2015.

"Visual-Manual NHTSA Driver Distraction Guidelines for In-Vehicle Electronic Devices", The Federal Register, The Daily Journal of the United States Government, A Notice by the National Highway Traffic Safety Administration on Feb. 24, 2012, pp. 1-121, <https://www.federalregister.gov/articles/2012/02/24/2012-4017/visual-manual-nhtsa-driver-distraction-guidelines-for-in-vehicle-eiectronic-devices>.

Basson et al., "Messaging in Attention Critical Environments", U.S. Appl. No. 14/823,009, filed Aug. 11, 2015, pp. 1-39.

IBM Appendix P, list of patents and patent applications treated as related, Nov. 1, 2016, 2 pages.

* cited by examiner

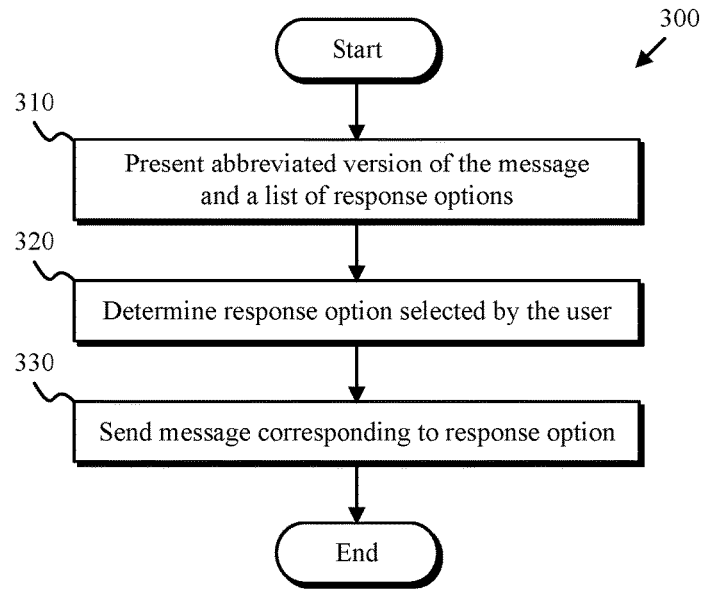

FIG. 3 thank you >> ty     you >> u     are >> r
two >> 2           to >> 2

FIG. 4A

Displayed or
Verbalized Text         Transmitted Message
r u headed home? ← 430

(1) Driving to ...    [I am currently driving to Price Chopper on Main Street. My ETA is 4:59 pm]
(2) Not yet          [I have not yet left for home]
(3) Can't talk ...     [I am currently driving and cannot respond for at least 10 minutes]
(4) Transcribe ...    [*Transcribed message ...*]
(5) No response

Automatically Transmitted Message
Tom is currently driving to Price Chopper on Main St (ETA 10 minutes).
440 →     The party you contacted is currently driving.
             The party you contacted is currently busy.

FIG. 4C

MESSAGING IN ATTENTION CRITICAL ENVIRONMENTS

BACKGROUND OF THE INVENTION

The present invention relates generally to user communications and specifically to messaging in attention critical environments such as environments where a user operates a vehicle or other equipment.

Mobile devices such as cell phones, tablets, and laptops enable users to communicate in a wide variety of environments. However, some communication modes that are facilitated by these devices (e.g., email communications and text messaging) are incompatible with attention critical tasks and environments. For example, users that operate a vehicle or factory equipment must maintain sufficient focus to operate the vehicle or equipment reliably and safely.

SUMMARY

A method, executed by one or more processors, includes receiving a message that is addressed to a user, determining, via one or more sensors, whether the user is occupied with an attention critical situation, and conducting a user-directed response process responsive to determining that the user is not occupied with an attention critical situation. In some embodiments, the user-directed response process includes conducting a text substitution process on the message to produce an abbreviated version of the message, presenting the abbreviated version of the message and a list of response options to the user, determining a response option that is selected by the user, and sending a response to the message that corresponds to the response option that is selected by the user. In some embodiments, the list of response options includes a plurality of message-dependent formulated responses, a null response, and a spoken response. A corresponding apparatus and computer program product are also disclosed herein.

An apparatus, corresponding to the above method, includes a communication module configured to receive a message that is addressed to a user, a situation determination module configured to determine whether the user is occupied with an attention critical situation, and a response formation module configured to conduct, in response to determining that the user is not occupied with an attention critical situation, the above described user-directed response process.

BRIEF DESCRIPTION OF THE DRAWINGS

FIG. 3 is a flowchart depicting one example of a user-directed response method in accordance with at least one embodiment of the present invention;

FIG. 4A is a text diagram depicting various examples of text substitution in accordance with at least one embodiment of the present invention;

FIG. 4B is a text diagram depicting one example of a message response menu in accordance with at least one embodiment of the present invention;

FIG. 4C is a text diagram depicting one example of automated responses in accordance with at least one embodiment of the present invention;

DETAILED DESCRIPTION

Messaging (e.g., texting or sending emails) is a preferred mode of communication for many individuals. However, most jurisdictions have laws that prohibit the use of hand operated devices when driving. Consequently, some drivers use hands-free voice communications in order to communicate with others. However, some drivers, such as the hearing impaired, are unable to conduct voice communications and may choose to message while they are driving despite the laws against such activities. Furthermore, individuals that wish to communicate with a driver (whether hearing or hearing impaired) may be unaware that the driver is currently operating a vehicle. Consequently, messages are often sent to individuals who are driving or operating other equipment.

The embodiments disclosed herein were developed in response to the above issues and enable messaging in attention critical environments. It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter.

Figure 1A:
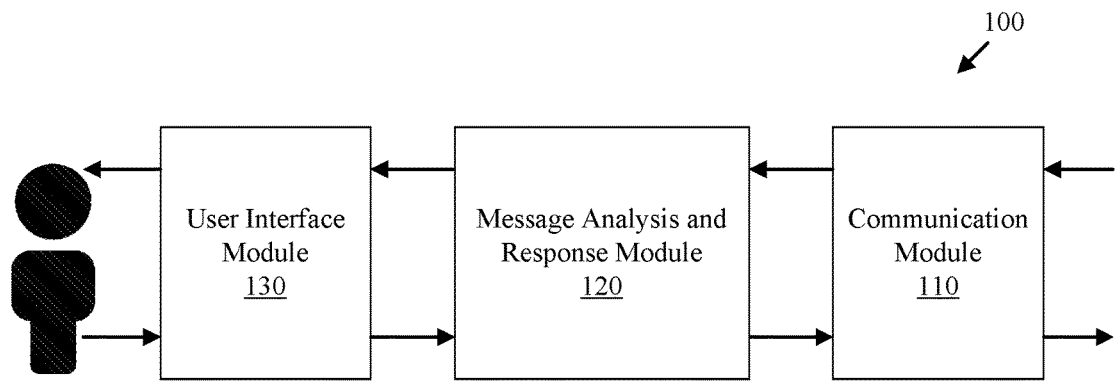
FIG. 1A is a functional block diagram depicting one example of a messaging apparatus in accordance with at least one embodiment of the present invention.

The present invention will now be described in detail with reference to the Figures. FIG. 1A is a functional block diagram depicting one example of a messaging apparatus 100 in accordance with at least one embodiment of the present invention. As depicted, the messaging apparatus 100 includes a communication module 110, a message analysis and response module 120, and a user interface module 130.

The messaging apparatus 100 enables a user to respond to messages in an attention critical environment.

The communication module 110 sends and receives messages such as email messages and text messages. The messages may be sent and received via electronic, photonic, or wireless means (not shown). The message analysis and response module 120 analyzes the content of messages, determines whether the user is occupied with an attention critical task and formulates various response options for the user.

The user interface module 130 enables interaction between the apparatus 100 and one or more users. For example, the user interface module 130 may present an abbreviated form of messages addressed to the user along with various response options. The abbreviated messages and response options may be presented through visual, aural, vibrational, or tactile means.

Figure 1B:
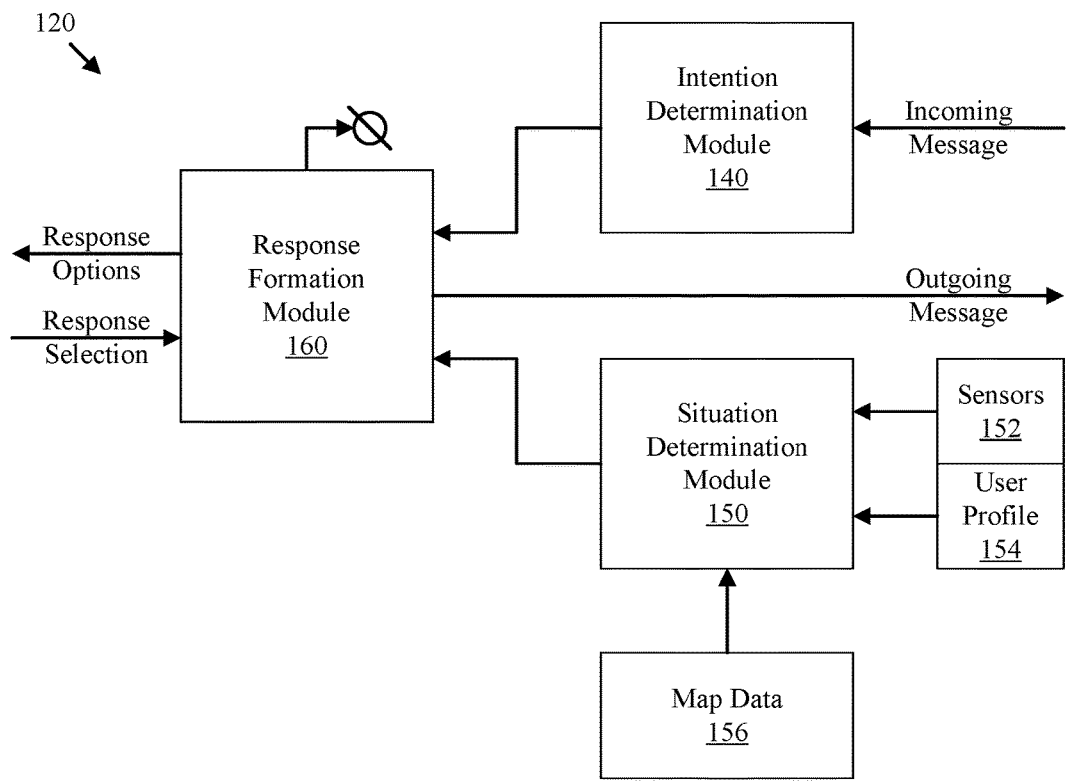
FIG. 1B is a functional block diagram depicting one example of a message analysis and response module in accordance with at least one embodiment of the present invention.

FIG. 1B is a functional block diagram depicting one example of the message analysis and response module 120 in accordance with at least one embodiment of the present invention. As depicted, the message analysis and response module 120 includes an intention determination module 140, a situation determination module 150, and a response formation module 160. The message analysis and response module 120 enables analysis of incoming messages and the formation of possible responses to the incoming messages.

The intention determination module 140 determines the intention of an incoming message. For example, the intention determination module 140 may determine a message topic, urgency, and whether the message provides or requests information. The situation determination module 150 determines the environment in which the user is situated (e.g., whether the user is currently operating a vehicle or some other equipment). The situation determination module 150 may use environmental information such as location, travel velocity, proximity to other vehicles, temperature, humidity, wind speed, and time. The situation determination module 150 may also use user activity information. The environmental information and user activity information may be provided by various sensors or other sources of information such as GPS devices, user interface devices, and internet web pages.

The situation determination module 150 may also leverage user related data such a personal statistics, personal preferences, driving habits and the like. Such data may be stored in a user profile 154 that is locally or remotely accessible to the situation determination module 150. In some embodiments, ignorable and un-ignorable messages topics and senders are stored in the user profile 154. In addition to environmental information and user related data, the situation determination module 150 may have access to map data 156 which may be locally or remotely stored. The map data 156 may be dynamic and include traffic congestion metrics for a selected route.

The response formation module 160 receives information regarding the intention of the message and the current situation for the user and formulates a set of response options. The response options may include message-dependent formulated responses. For example, keyword searching and/or text analytics may be used to generate message-dependent formulated responses. The response options may be presented to the user via the user interface module. In response to selection of an option, the user interface module may inform the response formation module 160 of the users selection. Subsequently, the response formation module may provide an outgoing message that corresponds to the selected option.

In some situations, the current situation for the user may be determined to be attention critical. In such situations, an automatic response may be generated by the response formation module 160. Additionally, the response formation module 160 may defer presentation of response options for a message until the current situation is determined to not be attention critical. For example, the response formation module 160 may defer presentation until the user is stationary or traffic congestion is sufficiently sparse to enable review of the response options.

Figure 2:
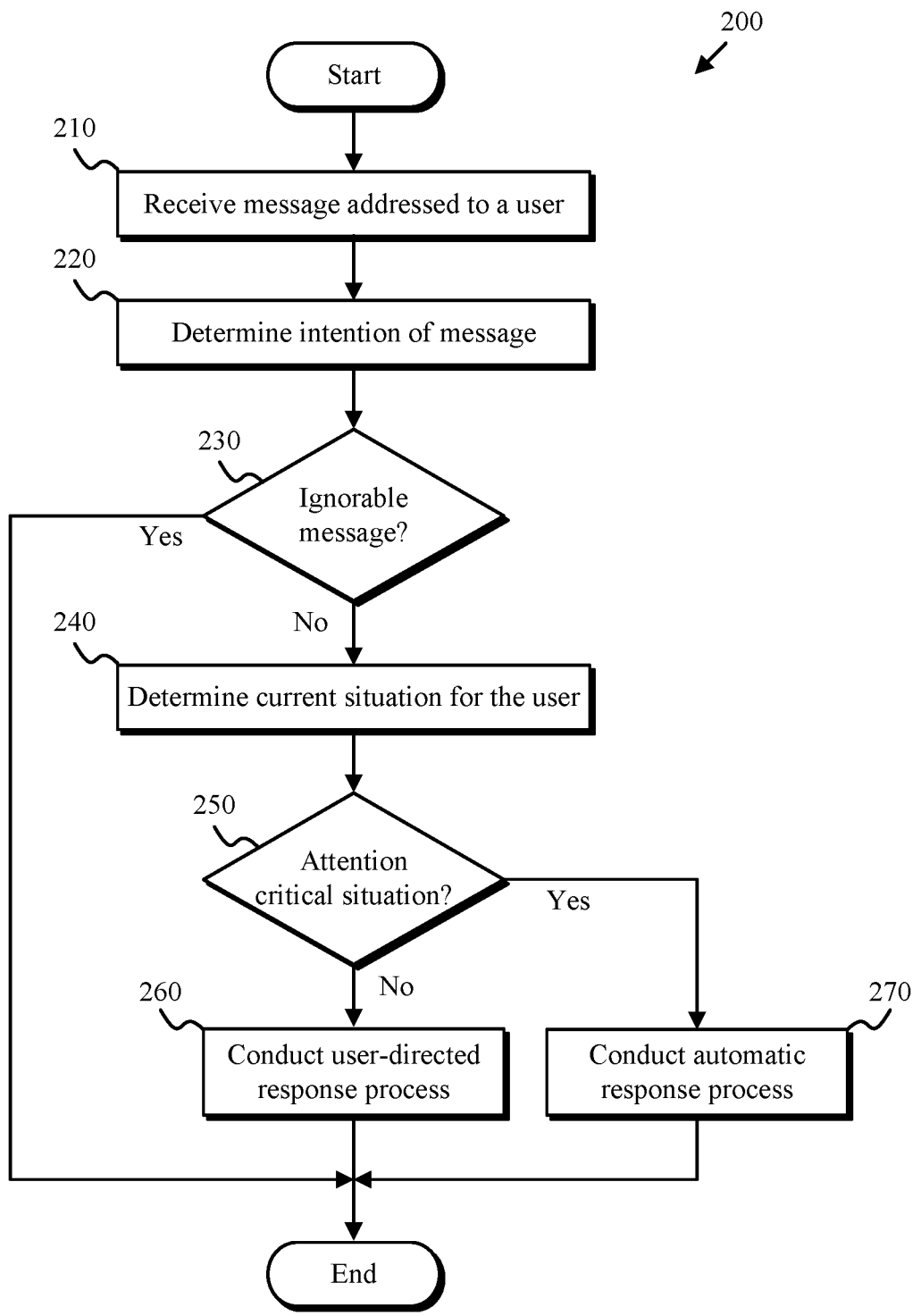
FIG. 2 is a flowchart depicting one example of a message handling method in accordance with at least one embodiment of the present invention.

FIG. 2 is a flowchart depicting one example of a message handling method 200 in accordance with at least one embodiment of the present invention. As depicted, the message handling method 200 includes receiving (210) a message, determining (220) an intention of the message, determining (230) whether the message is ignorable, determining (240) a current situation for the user, determining (250) whether the current situation is attention critical, conducting (260) a user-directed response process, and conducting (270) an automatic response process. The message handling method 200 may be conducted by the messaging apparatus 100 and enables a user to respond to messages while operating in attention critical environments.

Receiving (210) a message may include receiving a message addressed to a particular user. Determining (220) an intention of the message may include determining a message topic, a message urgency, and whether the message provides and/or requests information. Determining (230) whether the message is ignorable may include determining that the message is not urgent, or if the topic or sender of the message is ignorable or un-ignorable. If the message is determined to be ignorable, the method 200 terminates. If the message is determined to not be ignorable, the method 200 continues by determining (240) a current situation for the user.

Determining (240) a current situation for the user may include determining, via one or more sensors, an environment in which the user is operating, and how engaged the user may be in an activity. Determining (250) whether the current situation is attention critical may include evaluating the criticality of the current situation. If the current situation is not critical, the method continues by conducting (260) the user-directed response process.

If the current situation is critical, the depicted method continues by conducting (270) an automatic response process. Conducting (270) an automatic response process may include automatically generating and sending a response message. The contents of the response message may be dependent on the sender of the incoming message as well as the content of the incoming message.

In some embodiments (not shown), when the current situation is critical the method 200 waits (defers execution) until the current situation is not critical and then proceeds by conducting (260) the user-directed response process. Conducting (260) the user-directed response process may include formulating a list of response options to the user and sending a message corresponding to a user-selected response option.

FIG. 3 is a flowchart depicting one example of a user-directed response method 300 in accordance with at least one embodiment of the present invention. As depicted, the user-directed response method 300 includes presenting (310) an abbreviated message and a list of response options, determining (320) a selected response option, and sending (330) a message corresponding to the response option. The user-directed response method 300 enables a user to respond to messages without requiring the user to compose a message response.

Presenting (310) an abbreviated message and a list of response options may include conducting a text substitution process that shortens selected words and phrases within a message to an abbreviated form and presenting the abbreviated form to the user. Presenting (310) may also include presenting a list of formulated response options. The abbreviated message and list of response options may be presented visually or aurally. For example, the abbreviated message and list of response options may be overlaid on a portion of a windshield or instrument panel and/or verbalized via text to speech software. In addition to the incoming message, the list of formulated response options may also be presented in an abbreviated form that reduces the distraction time to the user.

Subsequent to the presenting operation 310 the method continues by determining (320) a selected response option. Determining (320) a selected response option may include enabling a user to indicate a selected response option and determining which response option the user selects. For example, a user may indicate the selected response through gestures or spoken commands. Subsequently, the method continues by sending (330) a message corresponding to the response option after which the method terminates.

FIG. 4A is a text diagram depicting various examples of text substitution in accordance with at least one embodiment of the present invention. As can be appreciated by one of skill in the art, text substitution may be used to shorten messages and reduce reading (i.e., distraction) time. Furthermore, in some embodiments messages non-relevant sections of messages such as greetings, signature lines and previous message threads are removed to further abbreviate messages.

FIG. 4B is a text diagram depicting one example of a message response menu 410 and corresponding transmitted messages 420. The depicted message response menu 420 includes response options that are dependent on the incoming message. The incoming message may be presented as an abbreviated message 430. As is shown, the response options included in the response menu 420 are also presented in abbreviated form in order to reduce the reading/distraction load on the user. Upon selection of a response option, for example by a gesture, eye movement or verbal command, a corresponding unabbreviated message may be transmitted.

As shown in FIG. 4C, in addition to user-directed responses, the embodiments disclosed herein enable automated responses 440. As is depicted, the amount of information provided in the automated response may vary according to user preferences and/or according to the sender of the incoming message, or similar factors. For example, some automated responses may provide detailed location and estimated time of arrival (ETA) information while others may provide minimal information to the sender.

Figure 5A:
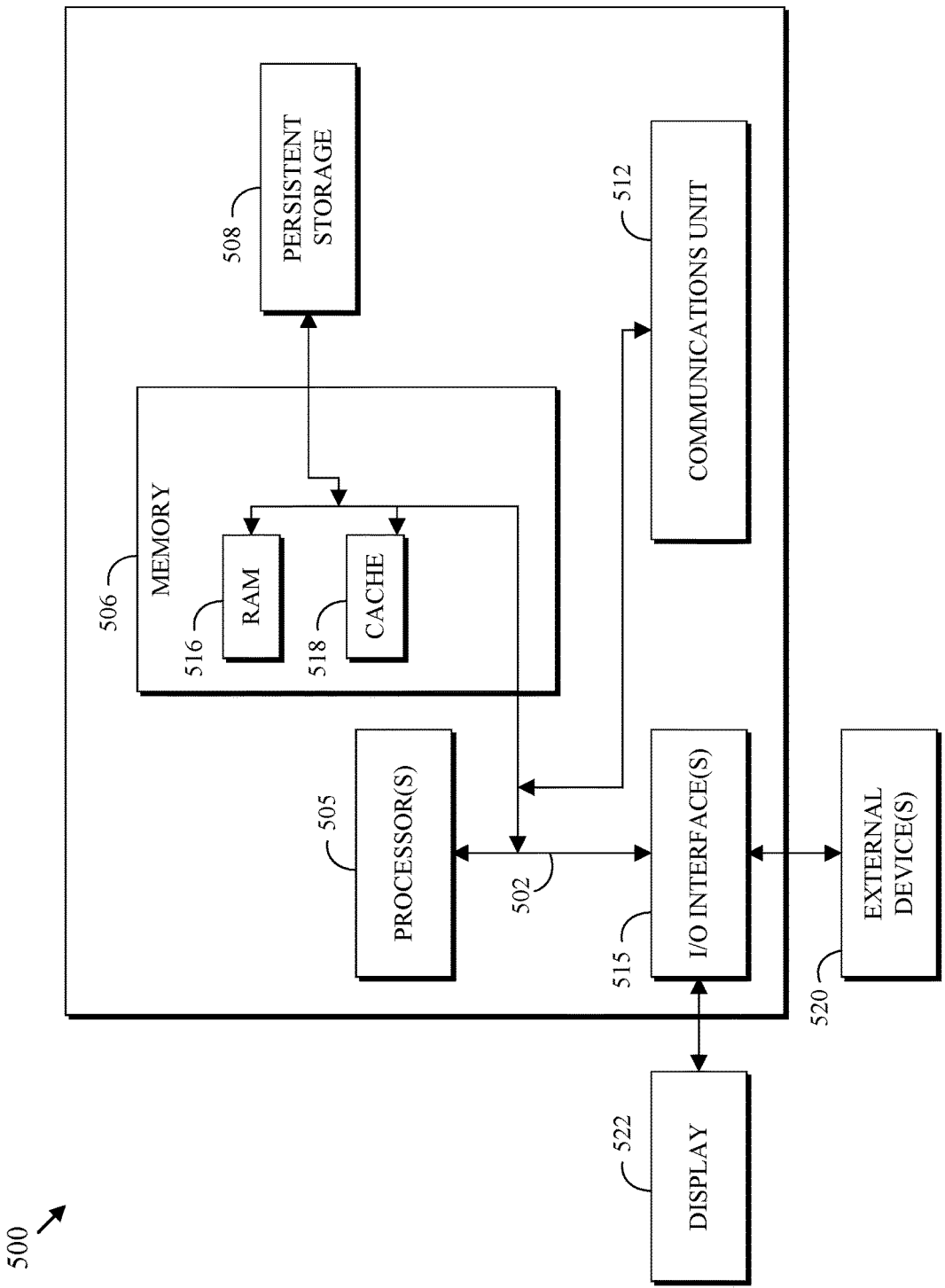
FIG. 5A is a block diagram depicting one example of a computing apparatus (i.e., computer) suitable for executing the methods disclosed herein.

FIG. 5A is a block diagram depicting one example of a computing apparatus (i.e., computer 500) suitable for executing the methods disclosed herein. It should be appreciated that FIG. 5A provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 505, memory 506, persistent storage 508, communications unit 512, and input/output (I/O) interface(s) 515. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 505 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 515 allows for input and output of data with other devices that may be connected to computer 500. For example, I/O interface 515 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 515. I/O interface(s) 515 may also connect to a display 522. Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5B:
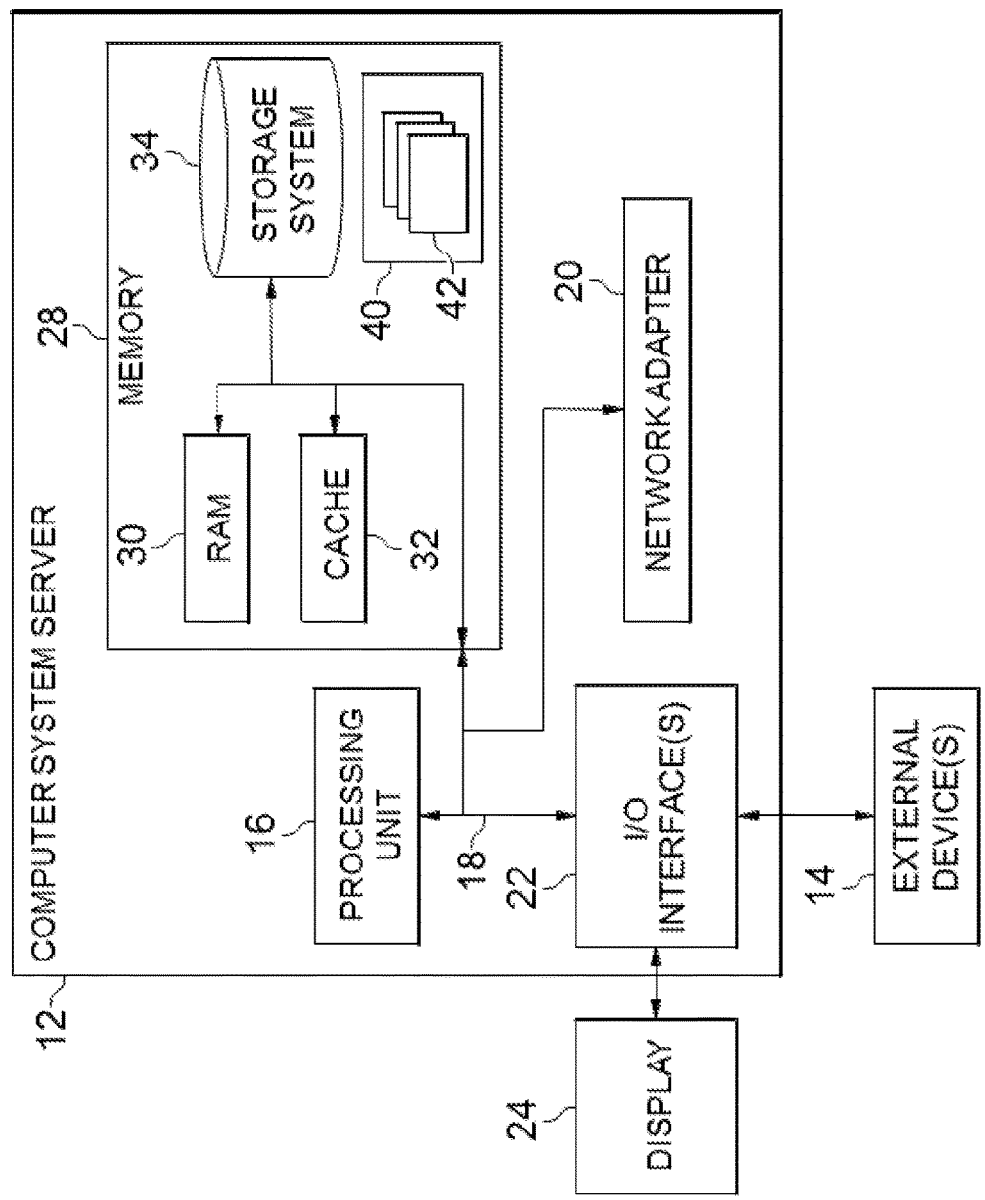
FIG. 5B depicts a cloud computing node according to an embodiment of the present invention.

Referring now to FIG. 5B, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
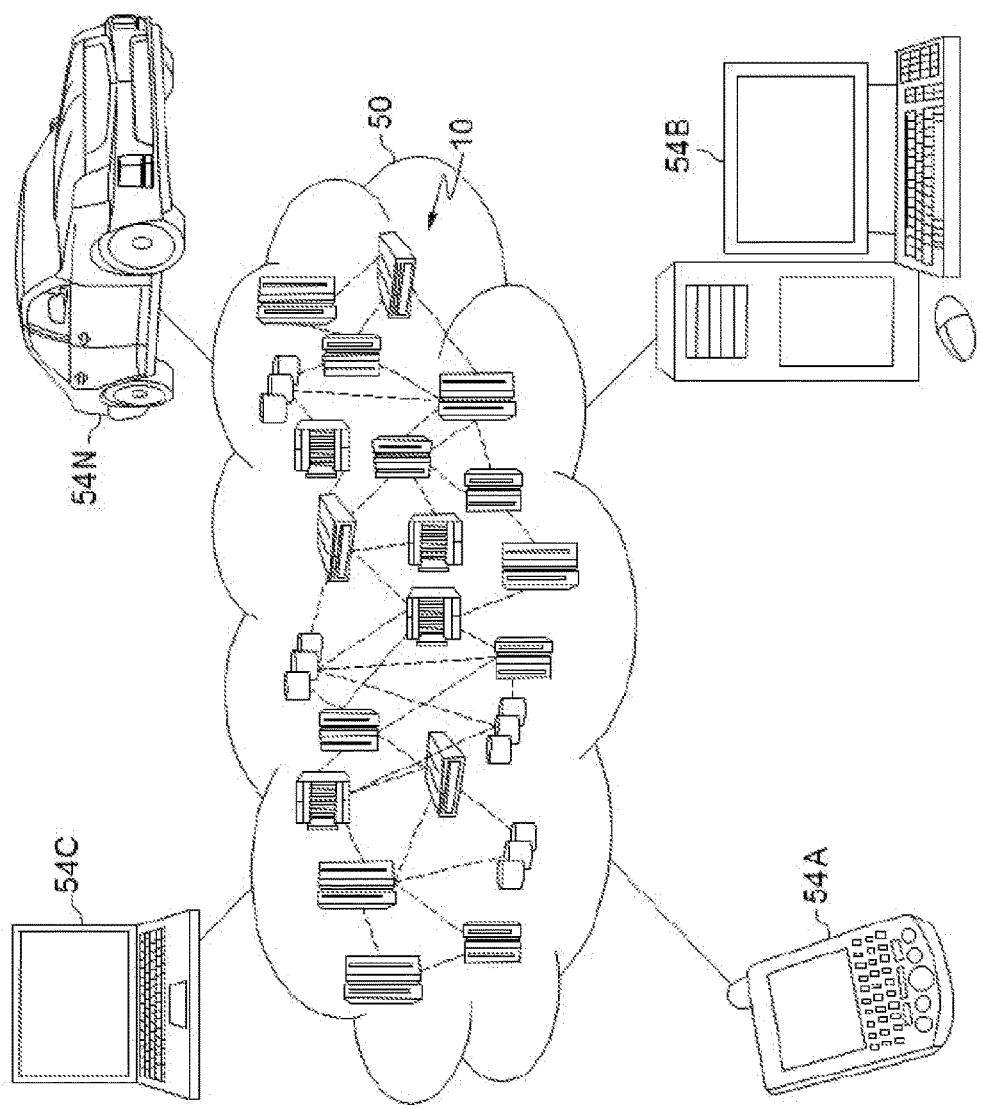
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
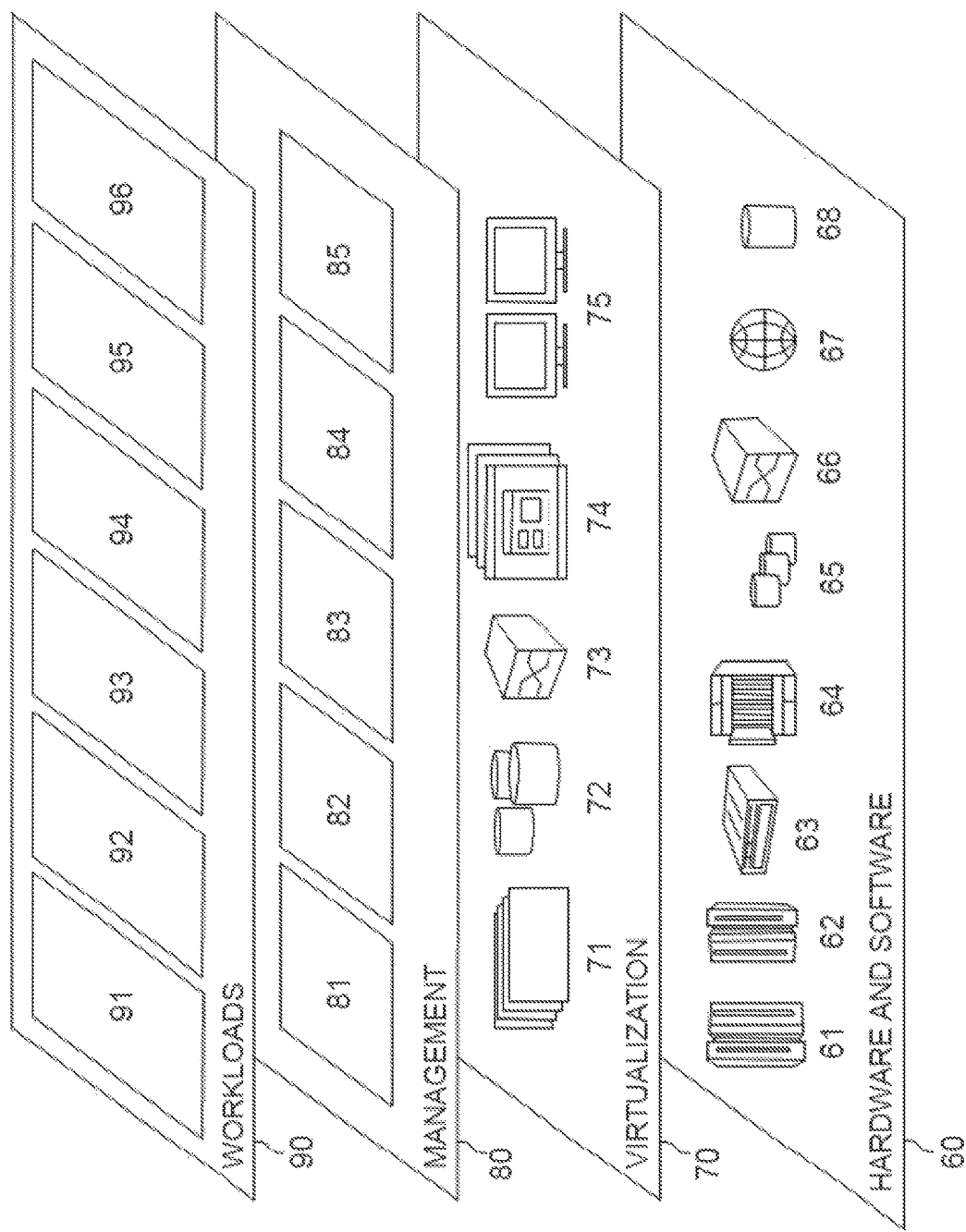
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and deployed enterprise application 96.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method, executed by one or more processors, the method comprising:
   receiving a message that is addressed to a user;
   determining a topic for, and a sender of, the message;
   determining, from a user profile, whether the topic and the sender are ignorable;
   ignoring the message responsive to determining that the topic or the sender is ignorable;
   determining, via one or more sensors, whether the user is currently operating a vehicle;
   automatically sending a message response in response to determining that the user is currently operating a vehicle and the message is not ignorable;
   responsive to determining that the user is not currently operating a vehicle and the topic and the sender are not ignorable, conducting a user-directed response process comprising:
      analyzing the content of the message;
      formulating a plurality of message-dependent responses based on the content of the message,
      conducting a text substitution process on the message to produce an abbreviated version of the message,
      presenting the abbreviated version of the message and a list of response options to the user,
   determining a response option that is selected by the user,
   sending a response to the message that corresponds to the response option that is selected by the user, and
   wherein the list of response options includes the plurality of message-dependent responses.

* * * * *